June 17, 1969   A. DVORAK   3,450,982
VOLTAGE REGULATOR CIRCUIT UTILIZING A FOUR-LAYER DIODE
TO CONVERT HIGH VOLTAGES TO LOW VOLTAGES
Filed Aug. 9, 1966

INVENTOR
ALFRED DVORAK
BY *Curphey + Erickson*
PATENT AGENTS

United States Patent Office 3,450,982
Patented June 17, 1969

3,450,982
VOLTAGE REGULATOR CIRCUIT UTILIZING A FOUR-LAYER DIODE TO CONVERT HIGH VOLTAGES TO LOW VOLTAGES
Alfred Dvorak, Ottawa, Ontario, Canada, assignor to Northern Electric Company Limited, Montreal, Quebec, Canada
Filed Aug. 9, 1966, Ser. No. 571,234
Int. Cl. H02p 13/00; H02m 3/06, 5/06
U.S. Cl. 323—81          3 Claims

ABSTRACT OF THE DISCLOSURE

A four-layer diode is used to simplify the monitoring of an output voltage which is to be maintained at a predetermined level.

The diode converts a voltage higher than the desired level to a low voltage, thus removing the need for a high voltage monitor by allowing both high and low voltage conditions to be monitored by a single low voltage monitor.

---

This invention relates to a voltage regulator circuit and more particularly to a voltage regulator circuit which obviates the necessity for a monitor for excessively high output voltages, requiring only a low output voltage monitor.

It is frequently desirable, as a general protective measure, to be able to detect any deviations of voltage levels, which voltages are delivered by a power supply or other means, beyond predetermined limits. In the past it has been necessary to employ separate monitoring units for high voltage and low voltage conditions. Advantageously, the present invention provides for the use of a monitor circuit requiring only a low voltage monitor, thereby substantially reducing the complexity and cost of the monitor circuit.

According to my invention, apparatus is provided for converting high output voltages to low output voltages through the novel utilization of the voltage-current characteristic of a semiconductor device.

The invention comprises a voltage regulator including a current limiting resistor connected in series therewith, and a variable impedance device, such as a Zener diode, connected in parallel so as to maintain a predetermined voltage drop across the output. Connected in parallel with the Zener diode is a variable impedance device such as a four-layer diode which has a high and a low resistance stable state and a negative resistance state therebetween. The voltage drop across the four-layer diode at the junction of the high resistance stable state and the negative resistance state is greater than the predetermined voltage drop, while in the low resistance stable state it is less than the predetermined voltage drop. By monitoring the output voltage for low voltage conditions only, failure of the Zener diode to provide a voltage output within predetermined limits will be monitored, since an output voltage lower than some predetermined level will be monitored directly by the monitoring circuit. On the other hand, an excessively high output voltage is converted by means of the four-layer diode to a voltage lower than the aforementioned predetermined voltage drop and can thus be monitored by the same monitor which detects excessively low output voltages. Consequently, no high output voltage monitor is required, and both high and low output voltages can be detected by the same low output voltage monitor.

An example embodiment of the invention is illustrated and further explained in connection with the accompanying drawings in which.

Figure 1:
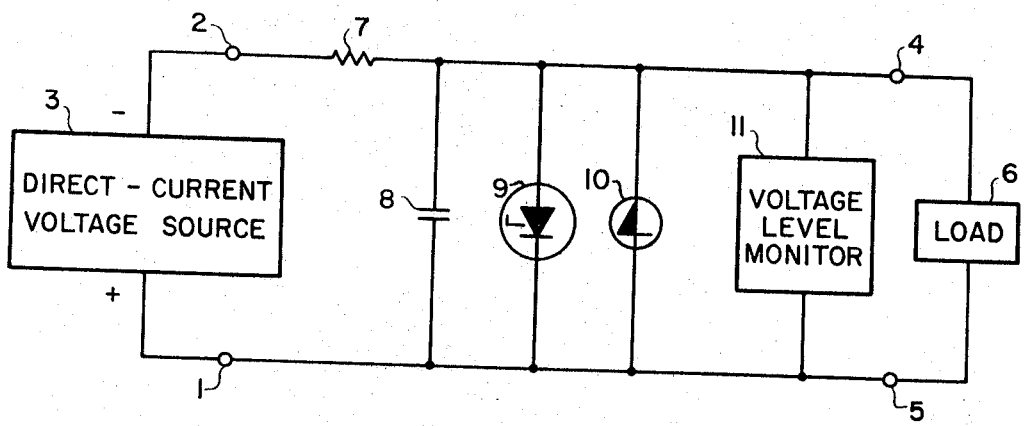
FIGURE 1 is a schematic circuit diagram of a voltage regulator circuit in accordance with the present invention.

Referring to FIGURE 1, the voltage regulator circuit comprises input terminals 1 and 2 for connection to the positive and negative terminals respectively of a direct-current voltage source 3. Output terminals 4 and 5 are for connection to a load 6. A current-limiting resistor 7 is connected between the terminals 2 and 4. A capacitor 8, a Zener diode 9, a four-layer diode 10 and a voltage level monitor 11 are all connected in parallel with the output terminals 4 and 5.

Figure 2:
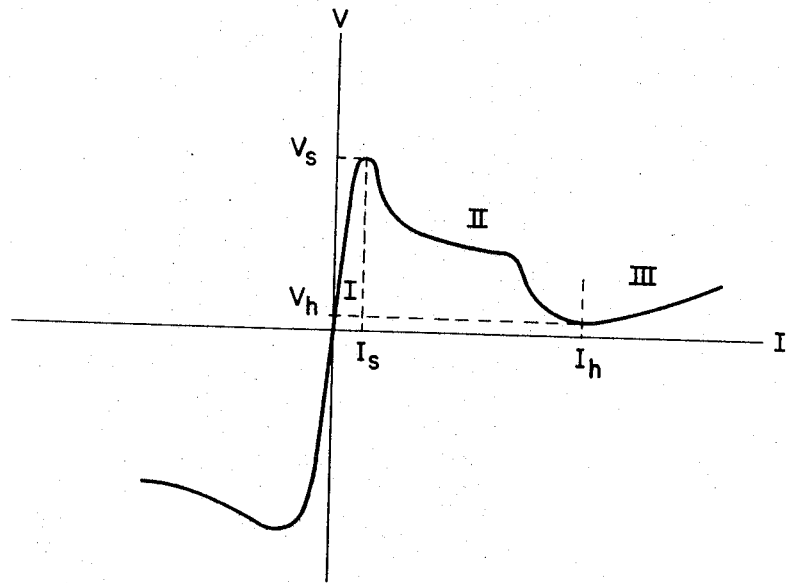
FIGURE 2 is the voltage-current characteristic curve of a four-layer diode, the semiconductor device used in carrying out the invention of FIGURE 1.

FIGURE 2 shows the voltage-current (V-I) characteristic curve of the four-layer diode 10. Three essential operating regions are shown. Region I is the "OFF" or high resistance stable state, region II is the transition or negative resistance state and region III is the "ON" or low resistance stable state. The switching voltage $V_s$ is the voltage drop across the four-layer diode 10 at the junction of the high resistance stable state and the negative resistance state. The switching current $I_s$ is the current which flows through the four-layer diode 10 at the switching voltage $V_s$. The holding voltage $V_h$ is the voltage drop across the four-layer diode 10 at the junction of the negative resistance state and the low resistance stable state. The holding current $I_h$ is the current which flows through the four-layer diode 10 at the holding voltage $V_h$.

In the operation of the circuit shown in FIGURE 1, a substantially constant voltage is obtained across the Zener diode 9. Any short time duration voltage transients which occur are absorbed by the capacitor 8. If the Zener diode 9 fails into an open circuit due to an excessively high voltage (higher than the breakdown voltage of the Zener diode) being applied across it or for any other season, the output voltage will rise due to less voltage drop across the resistor 7. The four-layer diode 10 is selected to have a switching voltage $V_s$ higher than the breakdown voltage of the Zener diode 9 but less than the output voltage without the regulation afforded by the Zener diode 9. When the voltage drop across the Zener diode 9 exceeds the switching voltage $V_s$, the four-layer diode 10 turns on and converts into a low impedance state thus reducing the output voltage to a very small value (about one volt). The voltage level monitor 11 will then detect a low output voltage condition and an alarm is given.

On the other hand, if the Zener diode 9 or the load 6 is short circuited, the output voltage will drop due to a greater voltage drop across the resistor 7. This low output voltage can be detected by the same voltage level monitor 11 used to detect the converted high output voltage.

Thus, through the novel utilization of a four-layer diode 10, a voltage regulator circuit has been produced requiring only a low output voltage level monitor 11, thereby greatly simplifying the voltage monitor circuit.

What is claimed is:

1. A voltage regulator circuit comprising: a pair of input terminals for connection to a direct-current voltage source; a pair of output terminals for connection to a load; a current limiting resistor connected in series between one of said input terminals and one of said output terminals, the other input terminal being connected to the other output terminal; a first variable impedance means, which maintains a substantially constant voltage drop of a predetermined level thereacross, connected in parallel with said pair of output terminals; a second variable impedance means having a high resistance stable state, a low resistance stable state, and a negative resistance state therebetween, the voltage drop across said second variable impedance means at the junction of the high resistance stable state and the negative resistance state being greater than said predetermined level, and the voltage drop across said second variable impedance means in the low resistance stable state being less than said predetermined level, said second variable impedance means being connected in parallel with said output terminals; a capacitor connected in parallel with said pair of output terminals; and voltage level monitor means responsive to the voltage across said output terminals for indicating when said voltage is less than said predetermined level.

2. A voltage regulator circuit as defined in claim 1 wherein said first variable impedance means is a Zener diode.

3. A voltage regulator circuit as defined in claim 2 in which said second variable impedance means is a four-layer diode.

References Cited

UNITED STATES PATENTS

| 3,197,716 | 7/1965 | Wright et al. | 307—287 X |
| 3,280,339 | 10/1966 | Sommers | 307—286 |
| 3,295,122 | 12/1966 | Kirk | 340—248 |
| 3,312,863 | 4/1967 | Muldoon | 317—16 X |
| 3,365,617 | 1/1968 | Flanagan | 317—31 |

OTHER REFERENCES

Haddon and McClearn, Jr., "Current Overshoot Detector," IBM Technical Disclosure Bulletin, vol. 2 No. 5, February 1960, pp. 53, 54.

JOHN F. COUCH, *Primary Examiner.*

A. D. PELLINEN, *Assistant Examiner.*

U.S. Cl. X.R.

317—31; 340—248